April 11, 1961 K. REINER 2,979,060
CLAMP BIASED CLOSED BY SPRING MEANS
Filed June 16, 1958 2 Sheets-Sheet 1

INVENTOR.
KENNETH REINER
BY
ATTORNEY

April 11, 1961 K. REINER 2,979,060
CLAMP BIASED CLOSED BY SPRING MEANS
Filed June 16, 1958 2 Sheets-Sheet 2

INVENTOR.
KENNETH REINER
BY
ATTORNEY

United States Patent Office 2,979,060
Patented Apr. 11, 1961

2,979,060

CLAMP BIASED CLOSED BY SPRING MEANS

Kenneth Reiner, 7875 Telegraph Road, Rivera, Calif.

Filed June 16, 1958, Ser. No. 742,167

7 Claims. (Cl. 132—48)

This invention relates to pivoted clamps or clips, and more specifically to pivoted clamp or clip assemblies which are spring-biased to closed position. Clamps of this nature, while obviously of general utility, are herein described in conjunction with their utility as pin curl clips, wherein they are employed for clamping a lock of hair to maintain it in a form known as a "pin curl."

Such devices are widely used in the curling and setting of hair and many varieties thereof have been developed. Thus, pin curl clips have been made of one, two, three or more pieces, and in various styles and shapes. In recent years, two-piece clips have become extremely popular because of their manufacturing economy and because of the development of reliable integral means for suitably holding the two pieces together and affording effective pivot and spring means therefor, while providing a satisfactory clamping action. One example of such a two-piece clip is shown in U.S. Reissue Patent Number 23,163, issued November 1, 1949, to Armand Braga and myself, and the present invention is an improvement of the device disclosed therein.

Pin curl clamps according to said reissue patent were economical to manufacture in that it was not necessary to provide separate hinge and spring members, and furthermore the two parts were capable of assembly by merely snapping them together, so that both part and assembly costs were minimized. Moreover, because the design incorporated pivot means within the outlines of the clamping members, the pieces were able to be stamped from strip material with a minimum of waste material.

However, certain disadvantages and limitations were found to exist in such prior art clamps. For example, since both clamp members were made of relatively thin, yet hard and resilient sheet material, the attachment of ornamentation was either impractical or impossible.

A second disadvantage was that the clamping portion of the spring tongue, where it engaged the mating part, was exposed in such a manner as to occasionally allow the hair to become entangled, with consequent discomfort to the users, particularly when removal of the clip was attempted.

A third inherent disadvantage in the thin sheet-metal construction of the prior art resides in the fact that the thin construction of the top members of such clips causes a certain amount of bending to take place between the handles and the clamping portions thereof when the handles are depressed to open the clip against the spring pressure tending to keep the clip closed. Accordingly, in the prior art clips, a given desired degree of opening of the clamping portions required a relatively greater angle of divergence of the handles. This resulted in greater discomfort to the wearer, particularly when sleeping with the clips in the hair, and also in a tendency to limit the amount of stress which could be placed on the spring since spring stress was dependent upon the degree of movement of the handle member. Therefore, spring length and allowable stress had to be based upon the actual degree of movement of the handles rather than the desired degree of opening movement of the clamping portions in order to prevent stressing the springs beyond their elastic limit and causing impairment of spring function.

The present invention provides a novel pin curl clip construction, embodying the general principles of the aforementioned reissue patent, wherein the top clamp member may be non-plateform and have portions of substantial thickness and of a wide variety of configurations and may be made of materials of varying types, textures, colors, etc. Thus, although it is within the scope of this invention to bend sheet materials to a non-plateform configuration having imperforate handle means, it is particularly advantageous to resort to molded plastic, as in the illustrative modifications shown in the drawings, wherein plastic material is used and the top parts are molded of substantial thickness in any desired variation of color and ornamental or functional shape, including comb teeth or serrations for better holding the clamped curl, if so desired. Moreover, the imperforate and relatively rigid handle construction lends itself to a wide variety of means for the attachment of ornamentation to the handle or to the jaws, as for example jewels, flowers, ribbons, etc., by various means such a riveting, bonding, or the like.

The present novel clip or clamp construction is such that the upper member need have no apertures in the top surface of its handle or in the vicinity of the pivot area, thus correcting the tendency of the spring or pivot means of prior art pin curl clips to become entangled in the hair.

The provision of a hollow in a relatively thick portion of one of the members as a means for providing a chamber for housing the resilient spring means of the clamp construction, as taught in the present invention, overcomes the disadvantages inherent in the flexibility of the top members of prior art two-piece pin curl clips by providing a reinforced and strengthened rigid portion at the very area where the clips are most greatly stressed. Thus, since the handle of the top member of the present invention is rigid and forms a relatively unalterable angle with its integral clamping portion (as distinguished from the changeable angle formed by a similar part formed of thin sheet metal) the angularity of the handle may be selected without allowance for loss in motion caused by resilience of handle members of prior art constructions. Moreover, by virtue of the three-dimensional nature of the top member, the handle may be provided with stop means intended to limit movement of the jaws to provide a safeguard against stressing the spring of the clip beyond its elastic limit.

The present invention provides two-piece pin curl clip constructions wherein one of the members may be inexpensively formed of plastic materials, which are resistant to the chemical action of hair waving solutions containing moderately strong alkalis or acids. Such constructions are thus cheaper to fabricate than prior art two-piece clips wherein both members were made of expensive stainless steels or aluminum.

A still further advantage is presented by the novel constructions of the pivot spring, and spring retaining means, all of which make assembly extremely simple. Moreover, for the laterally coextensive upper and lower members of the illustrative embodiments shown herein, the use of simple mass production mechanical assembling procedures is made possible.

In the present invention the spring tongue which holds the two clamp pieces together and biases them to a closed position is housed in a chamber and the surface against which the spring operates is not visible to the exterior. Accordingly, if materials which are easily damaged by wear (as coated surfaces, for example) are utilized in either or both of the clip pieces, any wear spot which occurs will be on the inside of the chamber and will not detract from the appearance of the clip.

Therefore, one object of the present invention is to provide a novel two-piece clamp wherein one member may be of plastic material.

A further object of this invention is to provide novel two-piece pin curl clip constructions wherein one of the members may be of molded plastic construction whereby resistance to corrosion from hair-waving solutions may be afforded more economically than by utilizing two metallic pieces made of corrosion resistant material.

A still further object of the present invention is the provision of a two-piece pin curl clip construction wherein the top member is imperforate in the area of the handle whereby catching of the clip in the hair of the wearer is minimized.

Another object of the invention is to provide a novel pin curl clip construction wherein the handle of the top member is of such construction that decorative insignia may be easily and lastingly riveted or bonded thereto.

Another object of the present invention is to provide devices of the class described wherein the top clamp member is relatively rigid in the pivot area whereby the angularity of the handle to the clamping portion is constant so that the clamp may be designed for maximum ease of manipulation and comfort to the user. Additionally said top clamp member may incorporate rigid stop means to provide a constant safeguard against overstressing the spring tongue which holds the pieces together and biases the clamping portion toward closed position.

Yet another object of the present invention is to provide a novel two-piece clamp wherein the free end of the spring tongue on one member, which is used to bias the clamping portions toward closed position, is contained in a pocket or chamber in the other member, whereby surface damage caused by moving engagement of the spring tongue against a surface of said other member is concealed within the pocket or chamber so that the outward appearance of the clamp is not marred thereby.

Another object of the present invention is to provide an inexpensive two-piece pin curl clip construction wherein one member is of a molded plastic material, which is a natural economical medium for providing variations in configuration for ornamentation or for functional purposes, as for example hair shaping forms, comb teeth, and serrations for holding the clip in position and for assisting in a hair-dressing function.

These and other objects and the attendant advantages of this invention will be apparent from the following detailed description and claims, taken in conjunction with the attached drawings, wherein like parts are indicated by like reference numerals, and wherein:

Figure 4 is an enlarged sectional view taken along the line 4A—4A of Figure 2, looking in the direction of the arrows, showing an end view of the spring and chamber means;

Figure 7:
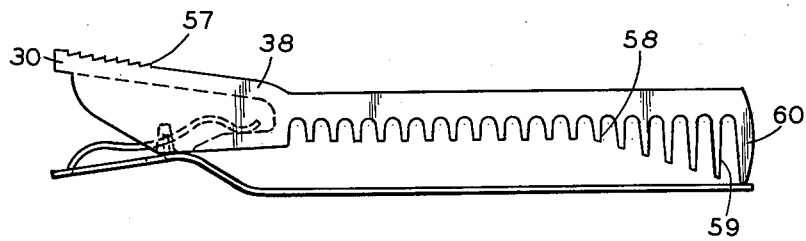
Figure 6:
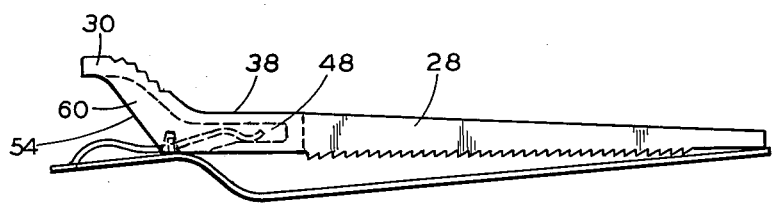

Figure 6 is a central sectional view of a modification of the invention, illustrating a variation in configuration of the handle construction; and Figure 7 is a side elevation of a further modification, illustrative of another one of the wide variety of ornamental and functional forms made possible by the present invention, with dotted lines showing some of the hidden parts, for clarity of illustration.

Referring now to the drawings, preferred embodiments of clamps according to the present invention comprise two elements or pieces in the form of elongated members 10 and 12 which are superposed upon each other when in assembled relation, as shown in the drawings. In the normal use of such clamps, the member 10 is closest to the head of the wearer and is designated the lower or bottom member, and the member 12 which is outwardly disposed from the head of the wearer, is designated the upper or top member.

Figure 2:
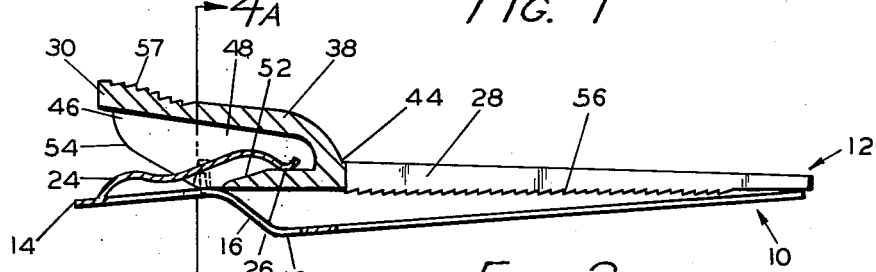
Figure 2 is a central sectional view taken along the line 2—2 of Figure 1.
Figure 3:
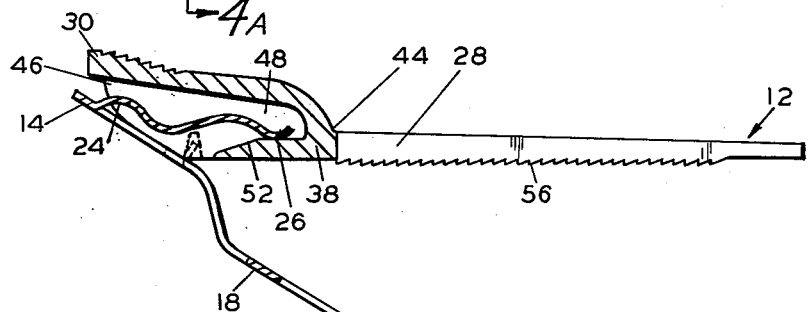
Figure 3 is a view similar to Figure 2, showing the clamp in its open position.
Figure 5:
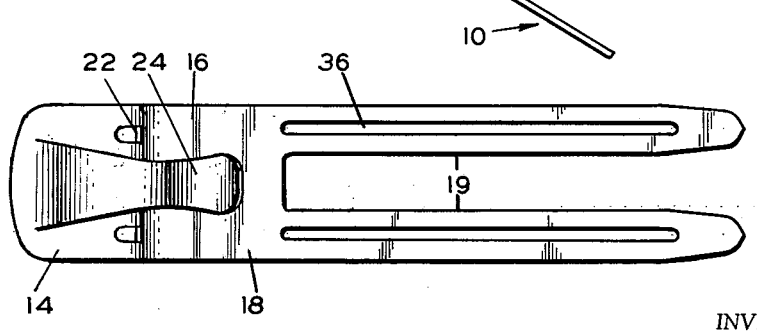
Figure 5 is a plan view of a bottom member only.

The bottom member 10 is best illustrated in Figures 2, 3 and 5 of the drawing, and comprises an elongated resilient plate having a rearwardly extending handle 14 and a forwardly extending clamping portion 18, and having a pair of upstanding spurs 22 struck up from the material in the area of juncture of said handle and clamping portion. The clamping portion 18 may have an angularly disposed inclined section 16 adjacent the area of juncture with the handle 14, as shown in the drawings, so that the handle and the main body of the clamping portion are roughly parallel but offset from one another. The clamping portion 18 may comprise a pair of spaced parallel legs 19 which are open at the forwardly disposed free ends for entry into the hair of the user. A spring tongue 24 is struck from the material of the bottom member, having its root in the handle thereof, and may include material cut from the inclined section 16 and an adjacent section of the clamping portion. The spring tongue, therefore, is integral with the handle, and has a free end extending forwardly toward the clamping portion. Spring tongue 24 extends upwardly and outwardly from the member 10 as shown, and extends forwardly beyond the spurs 22. The spring tongue may be provided with a bent surface, as at 26, if desired, to provide a line contact and thus reduce friction upon engagement with a cooperating surface, as will be later discussed. The bottom member, as described, is common to all of the illustrative embodiments disclosed in this specification, and may be interchangeably used with each of the top members to be described hereinbelow as well as with other variations of form of the top member.

In the illustrated preferred embodiments, the top member is made of molded plastic material, and for this purpose any formable plastic material such as, for example, polystyrene, may be used. Accordingly, top members 12 may take a wide variety of shapes and forms, some of which will be described hereinafter. However, the modifications have general structural characteristics which are common to all, and a single description should suffice as to such characteristics. Thus, each top member may comprise a unitary piece adapted to be superposed over the previously described lower member 10, having sockets 40 adapted to receive the spurs 22 of the lower member, and having a chamber 48 adapted to receive the spring tongue 24 of the lower member. The sockets 40 are in the general area of the pivot of the clamp and the top member 12 has a handle 30 on one side of said sockets, adapted to be superposed over the handle 14 of the bottom member 10, and a clamping portion 28 adapted to be superposed over the clamping portion 18 of the said bottom member. When the parts are assembled, as shown in the drawings (see Figures 2 and 6), the act of pressing the handles 14 and 30 together is effective to rock the members upon each other to cause the clamping portions to open (as in Figure 3).

The clamping portion of the top member of each of the embodiments has a thickened imperforate section 38 at the rearward end thereof adjacent the handle 30. This thickened section 38 has a pocket or chamber 48 therein, the said pocket or chamber extending longitudinally toward the remote forward end of the clamping portion and opening in a rearward direction, as shown in the drawings, and being of a width to receive the spring tongue 24 of a bottom member therein. It is an important feature of this invention that the said chamber or pocket 48 is so formed that the walls defining it are all connected to one another to form a rigid construction. This may be accomplished within the scope of this invention, by known metal working techniques if metallic parts are desired, but it is preferable to form the top members of suitable plastic materials, which allow the use of simple molding techniques to provide hollows or pockets in thickened portions of clamp members.

The chamber 48, in each of the embodiments, may be of generally diminishing dimension as it extends forwardly toward the free end of the clamping portion to serve to guide the spring tongue 24 into its ultimate position within the chamber. Moreover, the upper surface of the wall defining the bottom of the chamber 48 may be formed of varying thicknesses by tapering said wall to provide an inclined surface 52 which provides a larger entry area at the rearwardly disposed open end of the chamber and serves also to gradually prestress the tongue entering the chamber as the clamp is assembled.

The above described constructions are assembled by placing a top and a bottom member in longitudinal superposition, with the lower member rearwardly displaced to an extent such that the surface 26 of the spring tongue 24 is positioned at the rearwardly facing opening of the pocket or chamber 48. The lower member is then moved forwardly relative to the top member so that the end of the spring tongue advances into the chamber 48 along and past the tapered portion 52, where it is gradually prestressed. This motion is continued until the spurs 22 of the lower member enter into the sockets 40 of the top member, at which point the assembly of the clip is completed, with spring tongue 24 positioned within the chamber 48 so that it provides spring pressure for retaining the spurs 22 in the sockets 40, and urges the clamping portions 18 and 28 toward their closed position. Preferably the spring tongue 24 and the chamber 48 are of such length and so disposed that when the clip is fully assembled, the innermost end of spring tongue 24 is displaced a sufficient distance from the inner forward end of the chamber 48 to allow relative forward movement of the free end of the spring within the chamber when the clip is being opened. Similarly, the pocket or chamber 48 is preferably of sufficient vertical dimension at its entry end to allow clearance for bending of the spring tongue 24 when it is deformed by opening the clamp.

As previously mentioned, the present invention makes it possible to provide clamps or pin curl clips in a wide variety of shapes and forms for functional or ornamental purposes. The drawings illustrate three possible modifications of top members for clips according to this invention which will now be specifically described, insofar as the previous general description of such members does not apply.

Figure 1:
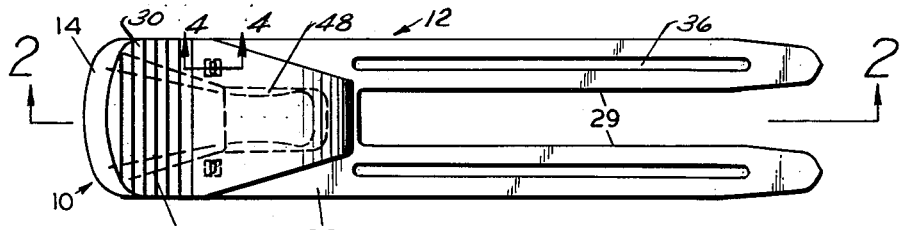
Figure 1 is a plan view of a preferred embodiment of the present invention with dotted lines showing some hidden portions for clarity of illustration.

Figures 1 to 3 illustrate a modification wherein the handle construction incorporates means to limit the opening movement of the members so that a safeguard is provided against stressing the spring tongue 24 beyond its elastic limit. Such a construction, as shown, also embodies a rounded and thickened appearance in the handle and pivot area to provide an attractive over-all configuration. Thus, the thickness of the section 38 is accentuated so that the top wall thereof is rounded upwardly angularly from the upper surface of the remainder of the clamping portion 28, as at 44, whereby the upper and lower walls of the chamber 48 are relatively widely separated, and whereby the handle 30 may be a substantially planar extension of the said upper wall of the chamber. The handle 30 is provided with side walls 46 which are continuations of the side walls of the chamber 48 so that the handle 30 with side walls 46 provide a channel construction leading into the chamber 48 and serve to provide rigidity in the handle and pivot areas. The side walls 46 may be tapered, as at 50, to provide a clearance space for the spring tongue at its root area when the clamping jaws are fully open. The side walls 46 have edges 54, extending from the pivot area rearwardly toward the free end of the handle 30 at a selected angle to the clamping portion 28. These edges 54 serve as stops when the clip is in its open position as shown in Figure 3, by abutting the handle portion 14 of the lower member, and thus limit the movement of the spring tongue 24 within its elastic limit. As previously discussed, the rigidity of the top member 12, in the area of the sockets and handle is such that the angle of the handle and of the edge surfaces 54 of the side walls are substantially unchangeable in normal use so that exceptional uniformity of operation is assured for the life of the clamp. The flat edge surfaces 54 also serve as cam surfaces in assembly by lifting the upper member 12 to the height of the spurs 22 just prior to their entry into sockets 40 during the assembly operation.

In operation, when the handles are pressed together to open the clamp, the spring tongue 24 is deformed and the end thereof rides forwardly a slight distance farther into the chamber 48 (compare Figures 2 and 3), the line surface 26 reducing friction to make such motion more facile. The clip may be opened against the bias of the spring tongue until edge surfaces 54 engage the top surface of handle 14 of the bottom member, as described above. Upon release of pressure on the handle, the spring tongue causes the clamping portions of the clip to close and to maintain a clamping pressure.

A possible variation in the shape of the top member 12 is shown in Figure 6, which illustrates the application of the present invention to a configuration which is of less bulk in the handle area than the previously described modification, and more nearly resembles the prior art conventional metallic clips in outline. In the modification of Figure 6 the handle 30 is relatively thin and extends angularly into its connection with the rearwardly disposed thickened section 38 of clamping portion 28 in the vicinity of the pivot area. The section 38 is a thickened tapered extension of the forwardly disposed bifurcate part of the clamping portion 28 and is provided with a rearwardly open pocket or chamber 48, as shown. When moldable materials are used the chamber 48 is formed in the molding of the part and is of the general configuration and construction of the chamber 48 as described in connection with Figures 1 to 3, and Figure 6, all of the walls defining the chamber thus being formed of the material of the thickened section to provide great rigidity. Handle 30 may be provided with side walls 60 depending from the under side thereof to provide a recess or space for the spring tongue 24 in the fully open position of the clip. Moreover, if desired, the extent of the walls 60 and the resulting depth of the recess under the handle 30 may be so chosen that the side walls of the recess have lower edges 54 which are adapted to serve the limiting stop function of the edges 54 of Figures 1 to 3 as previously described in conjunction with the modification of Figures 1 to 3.

The clamping portion of top members of the modifications of Figures 1 to 3 and of the modification of Figure 6, both described above, comprise a pair of spaced legs 29 to cooperate with the spaced legs of the clamping portion 18 of the bottom member to provide a generally perforate clamp structure for facilitating admission of air to hair clamped between the members. This air admission function may be augmented, if desired, by providing slots in the legs of the clamping portions as seen at 36. By virtue of the fact that the top member is molded of plastic it is possible to provide serrations 56 on the under side of the top member, to facilitate gripping of the hair. Similarly serrations 57 may be provided on the handle to allow better gripping of the clip by the user.

Another example of the wide latitude in shapes and functional design made possible by the present invention is illustrated in Figure 7 wherein the clamping portion of the top member 12 is shaped to provide sharp comb teeth 58 along the side edges thereof, and a lateral flange 60 at the forwardly disposed free end thereof adapted to engage the lower member 10 in the closed position of the clamp and wherein the length of said comb teeth is increased at the flanged end as at 59 to provide a clip adapted to hold a thick curl and having comb teeth for holding the strands of hair in position. The handle and chamber construction of this modification, as shown, is similar to that of the modification of Figures 1 to 3.

As mentioned hereinabove, the relative rigidity and imperforate construction of the molded plastic top members of the pin curl clips of the preferred embodiments of the present invention are such as to make possible the sturdy and lasting attachment of ornamentation and insignia to the handles of the clips, as by riveting or bonding.

From the above it may be seen that the present invention provides new and improved clamp constructions having particular adaptability for use as pin curl clamps. The novel constructions are characterized in simplicity and economy of construction and mode of assembly; in providing two-piece clamp constructions wherein the top member may be of molded plastic in a wide variety of ornamentation and functional design; in obviating prior art difficulties of entanglement in the hair of users, and in providing constructions adapted to have ornamentation attached thereto.

Obviously, many further modifications and variations of the present invention are possible without departure from the spirit of the invention. For example, the top members of the clamps may be of a wide variety of widths and planform shapes for various decorative, clamping or hair-styling functions. Moreover, the handles of the top members may be variously shaped to provide specific gripping advantages or decorative configurations. Thus, in place of, or in addition to lateral serrations such as the serrations 57, the handle might be provided with longitudinal ribs of various types, either extending the length of the handle or on the end thereof, to provide frictional resistance to lateral slipping. Also, to prevent lateral slipping, the handle might be formed in a concave configuration so that the finger of the user would be cradled and held against relative lateral movement. Moreover, it should be obvious that the novel spring retaining and biasing relationship disclosed herein is readily adaptable to pivot means other than that specifically illustrated in the examples shown in the drawings. It is therefore to be understood that the invention is not to be limited by the purely illustrative examples described herein, but rather by the scope and language of the appended claims, taken in the light of the foregoing specification.

What is claimed is:

1. A clamp comprising top and bottom superposed elongated members extending longitudinally with each other, each comprising a rearwardly extending handle and a forwardly extending clamping portion attached to said handle and pivot means in the area of juncture of the said handle and clamping portion, the pivot means of each of said members engaging the pivot means of the other member to hold said members against shifting relatively to each other, the clamping portion of said top member having a chamber therein, said chamber having a bottom wall and a rearwardly facing open end adjacent said pivot means, said chamber extending longitudinally forwardly from said open end, the bottom member having an integral spring tongue attached at its root to the handle thereof and having a free end extending forwardly across said pivot means, the free end of said spring tongue being slidably engaged within said chamber in contact with said bottom wall whereby the spring tongue is effective to tend to hold the members in assembled relationship and to urge the clamping portions toward their closed position.

2. The clamp of claim 1, further characterized in that the top member is of unitary molded construction, the handle of said top member being imperforate and the clamping portion thereof having comb teeth extending downwardly from its longitudinal edges and having a downwardly extending transverse flange at the extreme forward end thereof, said flange being adapted to contact the clamping portion of the bottom member in the closed position of the clamp, said comb teeth and flange providing space for a relatively large curl of hair between the clamping portions, said comb teeth engaging the curl to retain the shape of the curl and to assist in holding the clamp in the hair.

3. A clamp according to claim 1 further characterized in that the top member is of a unitary molded construction, whereby the said chamber is defined by said bottom wall and by the top and side walls which are rigidly interconnected with one another.

4. A clamp according to claim 3 further characterized in that the said chamber is of diminishing size as it extends forwardly toward the free end of the clamping portion, whereby to facilitate entry of said spring tongue into the chamber and to guide the free end thereof into position as the members are placed into assembled relationship.

5. A clamp according to claim 3 further characterized in that the said bottom wall of the chamber is thinnest at the said rearwardly facing open end of the chamber and is upwardly inclined as it extends into the chamber whereby entry of said spring tongue into said chamber is facilitated and said spring tongue is gradually prestressed as the two members are placed into assembled relationship.

6. A clamp comprising top and bottom superposed elongated members extending longitudinally with each other, each comprising a rerwardly extending handle and a forwardly extending clamping portion integrally attached to said handle and pivot means in the area of juncture of the said handle and clamping portion, said pivot means including spur means integral with one of said members and socket means on the other member, said spur and socket means cooperating to hold said members against shifting relatively to each other, the handle of said top member being imperforate, the clamping portion of said top member having a chamber therein, said chamber having a top wall and a bottom wall and a rearwardly facing open end adjacent said pivot means, said chamber extending longitudinally forwardly from said open end, the said bottom member having an integral spring tongue struck from its material and extending forwardly across the pivot means and into sliding engagement with said bottom wall of said chamber to hold the members in assembled relation and to constantly urge the clamping portions toward their closed position.

7. A clamp comprising a pair of superposed elongated members extending longitudinally with each other, each comprising a rearwardly extending handle and a forwardly extending clamping portion attached to said handle and pivot means in the area of juncture of the said handle and clamping portion, the pivot means of each of said members engaging the pivot means of the other member to hold said members against shifting relatively to each other, the handle of one of said members being imperforate and being angularly related to the handle of the other member whereby manipulation of said handles together and apart is effective to rock said members about an axis defined by said pivot means to open and close said clamping portions; the clamping portion of said one of said members being thicker in the area of juncture with the imperforate handle portion thereof than it is in its forwardly extending free end, said thickened portion having a chamber therein, said chamber having a rearwardly facing open end adjacent said pivot means and extending longitudinally forwardly within the body of said clamping portion and being defined by integral walls formed from the material of the thickened section, said imperforate handle forming an extension of the top surface of said thickened portion and having side walls forming extensions of the side surfaces of the said thickened portion, the lower edge of each of said side walls forming an angle with the clamping portion, the apex of said angle functioning as a fulcrum on which the members rock relatively to each other and the said edges being adapted to contact the handle of the said other member to limit the opening movement of said members, the said other member having a spring tongue projecting toward its clamping portion and engaged in said chamber to hold the members in assembled relation and to urge the clamping portions thereof towards their closed position.

References Cited in the file of this patent

UNITED STATES PATENTS

| | | |
|---|---|---|
| 206,896 | Porter | Aug. 13, 1878 |
| 236,242 | Newth | Jan. 4, 1881 |
| 447,736 | Murch | Mar. 3, 1891 |
| 721,313 | Lawless | Feb. 24, 1903 |
| 769,336 | Cahn et al. | Sept. 6, 1904 |
| 1,543,572 | Joyce | June 23, 1925 |
| 2,508,563 | Brown | May 23, 1950 |
| 2,637,329 | Reiter | May 5, 1953 |
| 2,799,281 | Leon | July 16, 1957 |
| 2,853,761 | Kettell et al. | Sept. 30, 1958 |

UNITED STATES PATENT OFFICE
CERTIFICATION OF CORRECTION

Patent No. 2,979,060                                  April 11, 1961

Kenneth Reiner

It is hereby certified that error appears in the above numbered patent requiring correction and that the said Letters Patent should read as corrected below.

Figure 4:
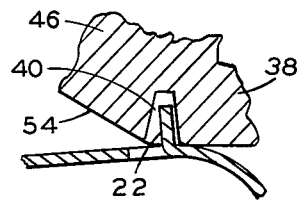
Figure 4 is an enlarged fragmentary view taken along the line 4—4 of Figure 1 showing the precise nature of the socket and spur means of the clamp.
Figure 4A:
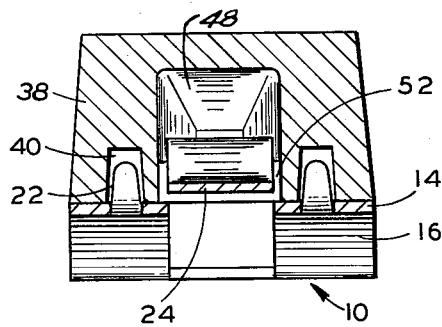

Column 3, line 64, for "Figure 4" read -- Figure 4a --; column 8, line 15, strike out "the".

Signed and sealed this 22nd day of August 1961.

(SEAL)
Attest:

ERNEST W. SWIDER
Attesting Officer

DAVID L. LADD
Commissioner of Patents